US009047157B1

(12) United States Patent  
Boussarov (10) Patent No.: US 9,047,157 B1  
(45) Date of Patent: Jun. 2, 2015

(54) METHOD AND APPARATUS FOR USING UNSPECIALIZED SOFTWARE MICRO-CONTAINERS FOR BUILDING COMPLEX DYNAMIC BUSINESS PROCESSES

(75) Inventor: Miroslav Svetoslavov Boussarov, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 369 days.

(21) Appl. No.: 13/360,347

(22) Filed: Jan. 27, 2012

(51) Int. Cl.  
G06F 9/44 (2006.01)  
G06F 9/445 (2006.01)

(52) U.S. Cl.  
CPC ........................................ *G06F 8/61* (2013.01)

(58) Field of Classification Search  
None  
See application file for complete search history.

(56) References Cited

U.S. PATENT DOCUMENTS

| | | | | |
|---|---|---|---|---|
| 7,127,713 | B2* | 10/2006 | Davis et al. | 717/177 |
| 8,225,307 | B2* | 7/2012 | Baker et al. | 717/174 |
| 8,255,904 | B2* | 8/2012 | Sheppard et al. | 717/177 |
| 2002/0129345 | A1* | 9/2002 | Tilden et al. | 717/162 |
| 2004/0148184 | A1* | 7/2004 | Sadiq | 705/1 |
| 2005/0155027 | A1* | 7/2005 | Wei | 717/162 |
| 2006/0206890 | A1* | 9/2006 | Shenfield et al. | 717/174 |
| 2006/0230396 | A1* | 10/2006 | Martinez et al. | 717/173 |
| 2006/0248069 | A1* | 11/2006 | Qing et al. | 707/4 |
| 2007/0038995 | A1* | 2/2007 | Boyle et al. | 717/177 |
| 2007/0083850 | A1* | 4/2007 | Kapoor et al. | 717/106 |
| 2008/0141234 | A1* | 6/2008 | Becker et al. | 717/162 |
| 2008/0141243 | A1* | 6/2008 | Sheppard et al. | 717/177 |
| 2008/0244560 | A1* | 10/2008 | Neagu et al. | 717/174 |
| 2008/0276234 | A1* | 11/2008 | Taylor et al. | 717/177 |

OTHER PUBLICATIONS

Vecellio et al.Containers for Predictable Behavior of Component-based Software. Proceedings of the 5th ICSE Workshop on Component-Based Software Engineering: Benchmarks for Predictable Assembly 2002, Retrieved on [Jan. 29, 2015] Retrieved from the Internet: URL<http://cse.spsu.edu/jwang/research/cbsd/References/CBSE5/Vecellio-cbse5-final.pdf>.*

Charfi et al. An aspect-based process container for BPEL. Proceedings of the 1st workshop on Aspect oriented middleware development. ACM, 2005. Retrieved on [Jan. 29, 2015] Retrieved from the Internet: URL<http://dl.acm.org/citation.cfm?id=1101564>.*

* cited by examiner

*Primary Examiner* — Thuy Dao  
*Assistant Examiner* — Cheneca Smith  
(74) *Attorney, Agent, or Firm* — Park, Vaughan, Fleming & Dowler LLP (57) ABSTRACT

One embodiment of the present invention provides a system that facilitates using unspecialized software micro-containers to build complex dynamic business processes. During operation, the system receives a command to execute a business logic at a computer system. In response to the command, the system initializes an unspecialized software micro-container from a pool of unspecialized software micro-containers. Next, the system retrieves the business logic from a business logic repository. The system then loads the business logic into the unspecialized software micro-container. Finally, the system executes the business logic in the unspecialized software micro-container. Note that the requestor publishes the desired business process in the repository, and the system, represented by the unspecialized containers, self-organizes to execute the job without additional management.

21 Claims, 8 Drawing Sheets

METHOD AND APPARATUS FOR USING UNSPECIALIZED SOFTWARE MICRO-CONTAINERS FOR BUILDING COMPLEX DYNAMIC BUSINESS PROCESSES

BACKGROUND

Related Art

Many organizations utilize multiple computing systems to manage their information and processes. For example, it is not uncommon for an organization to have a customer resource application, an accounting application, a personal information management system, etc. While each one of these systems adds value to the organization, it can be difficult for the organization to manage multiple disparate systems, especially when they may contain overlapping datasets. Because of this, many organizations deploy integration solutions that connect these disparate systems and allow for seamless workflows and reporting across these systems. However, this integration is not without its problems.

The integration processes built with conventional tools, i.e. Business Process Execution Language (BPEL), Enterprise Service Bus (ESB), integration Java solutions, etc., are static by nature. Extensive development and testing is required when a new process is developed and deployed, or an existing process is modified. In addition, such processes are difficult to scale because the resources allocated for the execution of such processes are again static and incapable of addressing sudden surges in demand.

SUMMARY

One embodiment of the present invention provides a system that facilitates using unspecialized software micro-containers to build complex dynamic business processes. During operation, the system receives a command to execute a business logic at a computer system. In response to the command, the system initializes an unspecialized software micro-container from a pool of unspecialized software micro-containers. Next, the system retrieves the business logic from a business logic repository. The system then loads the business logic into the unspecialized software micro-container. Finally, the system executes the business logic in the unspecialized software micro-container.

For example, in one embodiment the system receives a request to execute a business process. The system then publishes the required business process steps into a repository. The available unspecialized micro-containers, as part of the system, proactively reading the repository looking for a specialization, identify an available step in a business process, get the business logic required for this step again from the repository, and execute this step.

Note that the requestor publishes the desired business process in the repository, and the system, represented by the unspecialized containers, self-organizes to execute the job without additional management.

In some embodiments of the present invention, retrieving the business logic from the business logic repository involves retrieving the business logic from a predetermined Uniform Resource Locator (URL).

In some embodiments of the present invention, the system unloads the business logic and returns the unspecialized software micro-container to the pool of unspecialized software micro-containers.

In some embodiments of the present invention, the operations of unloading the business logic and returning the unspecialized software micro-container to the pool of unspecialized software micro-containers are performed when a pre-determined criterion is met.

In some embodiments of the present invention, the operations of unloading the business logic and returning the unspecialized software micro-container to the pool of unspecialized software micro-containers are performed at a pre-determined time.

In some embodiments of the present invention, receiving the command to execute the business logic involves receiving the command from a user.

In some embodiments of the present invention, receiving the command to execute the business logic involves receiving the command from a computer-implemented controller.

In some embodiments of the present invention, receiving the command from the computer-implemented controller involves receiving the command when a pre-determined criterion is met.

In some embodiments of the present invention, receiving the command from the computer-implemented controller involves receiving the command at a pre-determined time.

In some embodiments of the present invention, the unspecialized software micro-container is an Extensible Stylesheet Language Transformations (XSLT) container.

In some embodiments of the present invention, the unspecialized software micro-container is a scripting language container.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates using unspecialized software micro-containers to build complex dynamic business processes. During operation, the system receives a command to execute a business logic at a computer system. In response to the command, the system initializes an unspecialized software micro-container from a pool of unspecialized software micro-containers. Next, the system retrieves the business logic from a business logic repository. The system then loads the business logic into the unspecialized software micro-container. Finally, the system executes the business logic in the unspecialized software micro-container.

The unspecialized software micro-containers have a behavior similar to that of stem cells in biology. The unspecialized software micro-containers have no specific function initially. However, they are capable of interpreting signals from the environment and fulfilling specific functions when required. This may include becoming a component in a new business process or helping when more resources are needed for an existing business process. Essentially, an unspecialized software micro-container can become a content-based router, transformer, content enricher, content filter, etc.

In some embodiments of the present invention, retrieving the business logic from the business logic repository involves retrieving the business logic from a predetermined Uniform Resource Locator (URL). Note that while some of the examples below discuss retrieving the business logic from a predetermined URL, other methods of identifying a location for the business logic may be used.

In some embodiments of the present invention, the system unloads the business logic and returns the unspecialized software micro-container to the pool of unspecialized software micro-containers. Once the business logic is unloaded, the unspecialized software micro-container is available for a subsequent use.

In some embodiments of the present invention, the operations of unloading the business logic and returning the unspecialized software micro-container to the pool of unspecialized software micro-containers are performed when a pre-determined criterion is met. For example, if the unspecialized software micro-container was initialized with business logic to help alleviate a transaction bottleneck in a sales system, once the number of transactions per minute fall below a certain threshold, the unspecialized software micro-container may no longer be needed and may be returned to the unspecialized software micro-container pool.

In some embodiments of the present invention, the operations of unloading the business logic and returning the unspecialized software micro-container to the pool of unspecialized software micro-containers are performed at a pre-determined time. For example, the unspecialized software micro-container may be unloaded and returned to the unspecialized software micro-container pool at a specific time, such as at the end of a business day, or after a certain amount of time has elapsed since the unspecialized software micro-container's initialization.

In some embodiments of the present invention, receiving the command to execute the business logic involves receiving the command from a user. In many instances, users manipulate the business processes, either adding or removing processes, or changing the resources available to the business processes. For example, in anticipation of an event or product rollout, additional business processes may be initiated to handle the anticipated increase in demand.

In some embodiments of the present invention, receiving the command to execute the business logic involves receiving the command from a computer-implemented controller. For example, a computer-implemented controller that is monitoring system resources and existing business processes can activate additional business processes to cope with shifting demands on the computer system. This is described in more detail below.

In some embodiments of the present invention, receiving the command from the computer-implemented controller involves receiving the command when a pre-determined criterion is met, such as when a CPU utilization is too high, or there is a sufficiently large backlog in a transaction queue.

In some embodiments of the present invention, receiving the command from the computer-implemented controller involves receiving the command at a pre-determined time (for example, just prior to the release of a new product or service, or at the beginning of a work day).

In some embodiments of the present invention, the unspecialized software micro-container is an Extensible Stylesheet Language Transformations (XSLT) container, while in other embodiments, the unspecialized software micro-container is a scripting language container. Note that, while the examples herein refer to XSLT, any programming or scripting language may be used to implement embodiments of the present invention.

Exemplary Embodiment

Figure 1A:
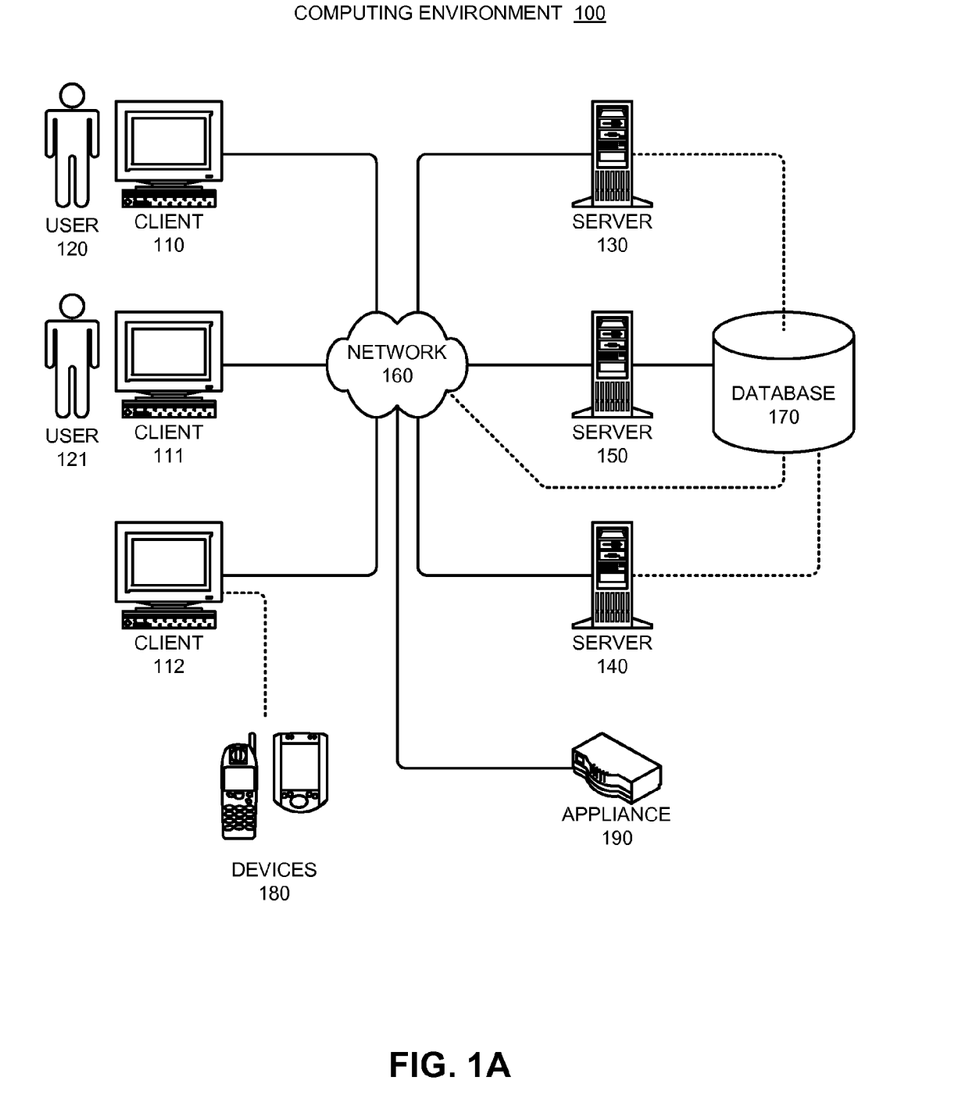
FIG. 1A illustrates a computing environment in accordance with an embodiment of the present invention.
Figure 1B:
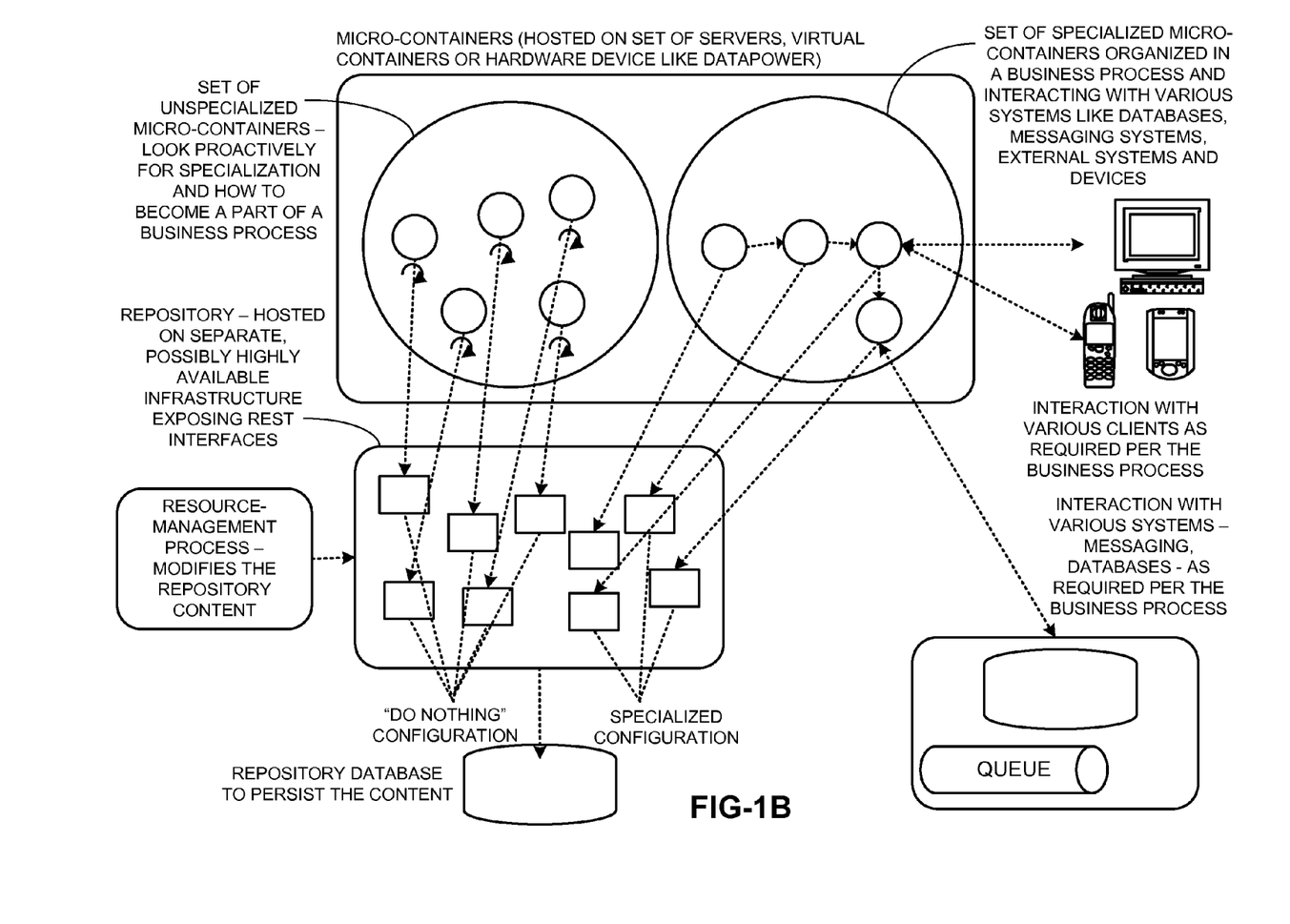
FIG. 1B illustrates an exemplary embodiment in accordance with an embodiment of the present invention.

FIG. 1B illustrates an exemplary embodiment in accordance with an embodiment of the present invention. FIGS. 1C-1F illustrate stages of two use cases of the exemplary embodiment in accordance with an embodiment of the present invention.

Figure 1C:
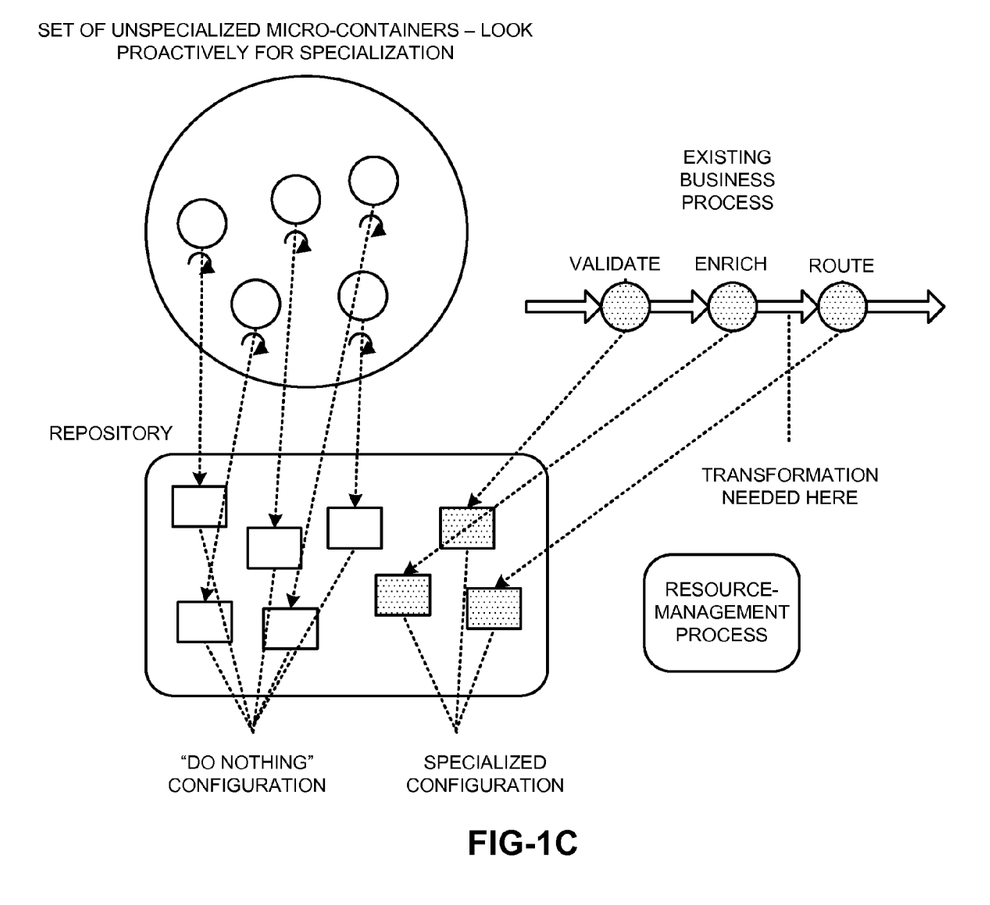
FIG. 1C illustrates stage one of use case one of the exemplary embodiment in accordance with an embodiment of the present invention.

In FIG. 1C, a set of containers form a business process in a first use case. In this use case, a new transformation/enrichment action needs to be added to this existing business process.

Figure 1D:
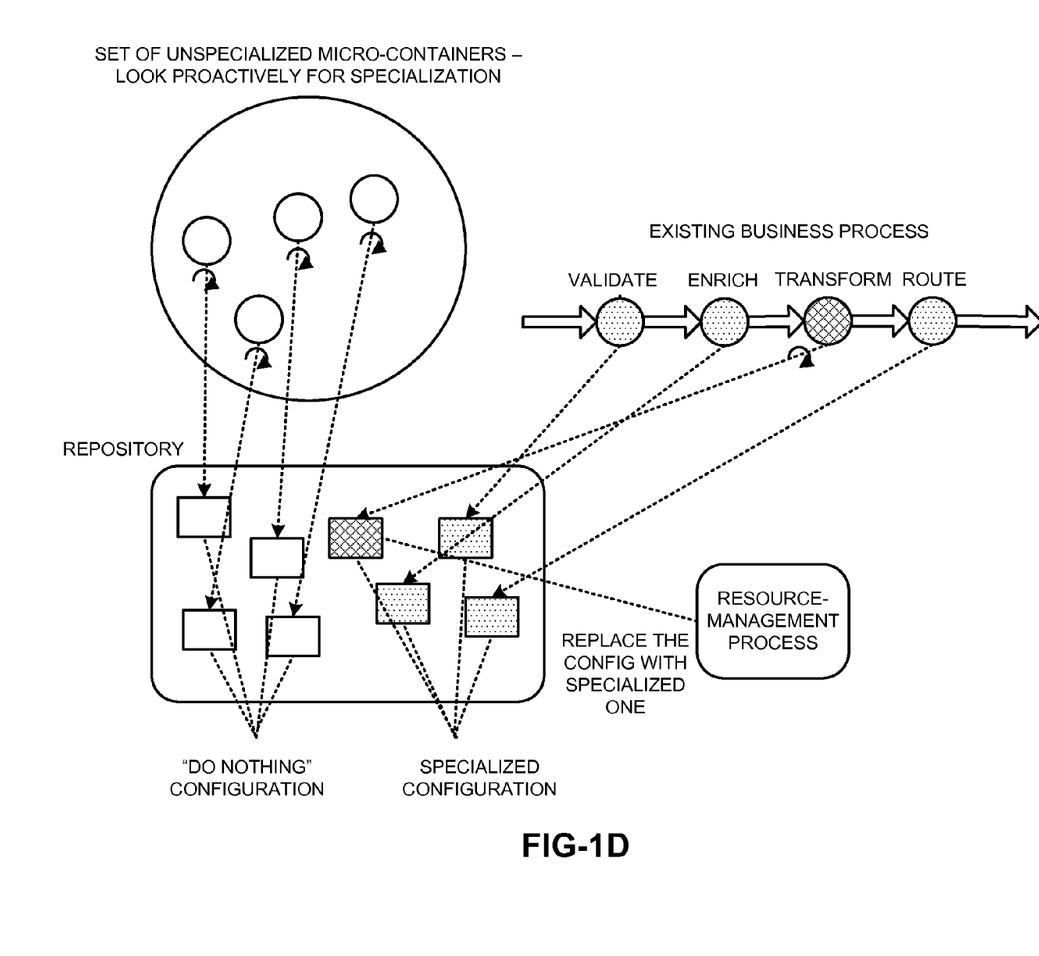
FIG. 1D illustrates stage two of use case one of the exemplary embodiment in accordance with an embodiment of the present invention.

In FIG. 1D, the resource-management process replaces the configuration of one of the non-specialized containers in the micro-containers set. If required, the resource-management process makes changes to the configuration of the containers participating in the process, so they can accommodate the new member and enhance the process sequence and logic.

Figure 1E:
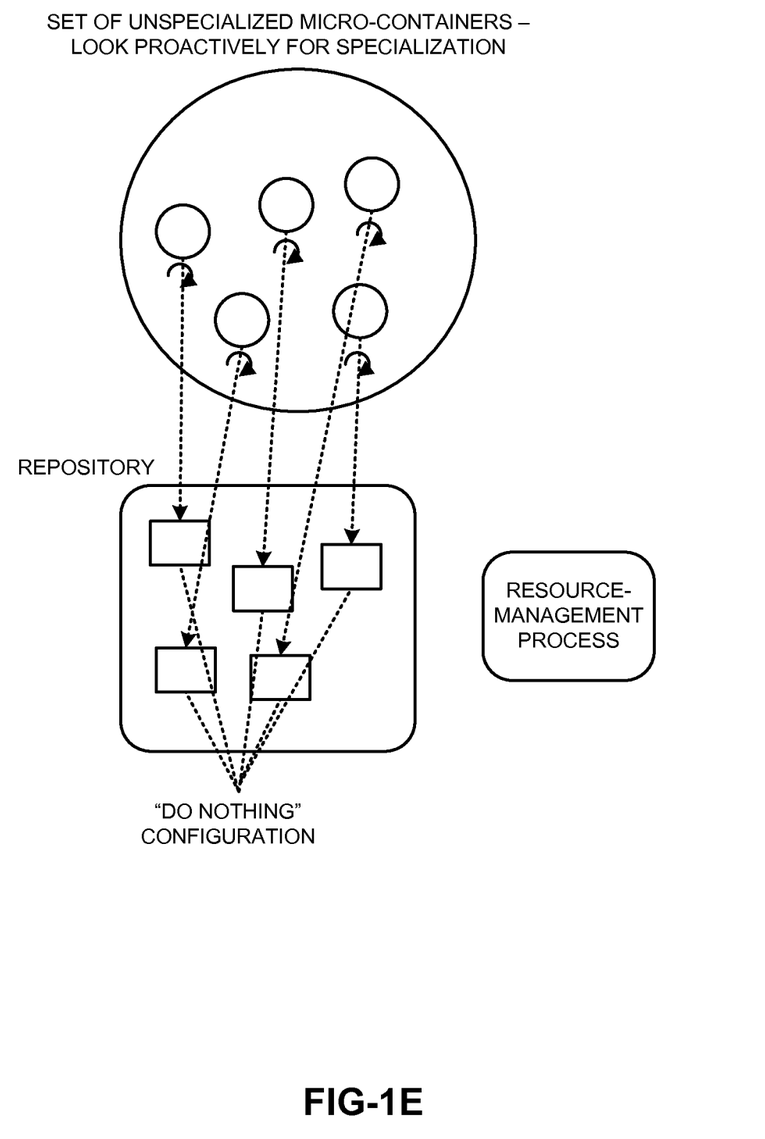
FIG. 1E illustrates stage one of use case two of the exemplary embodiment in accordance with an embodiment of the present invention.
Figure 1F:
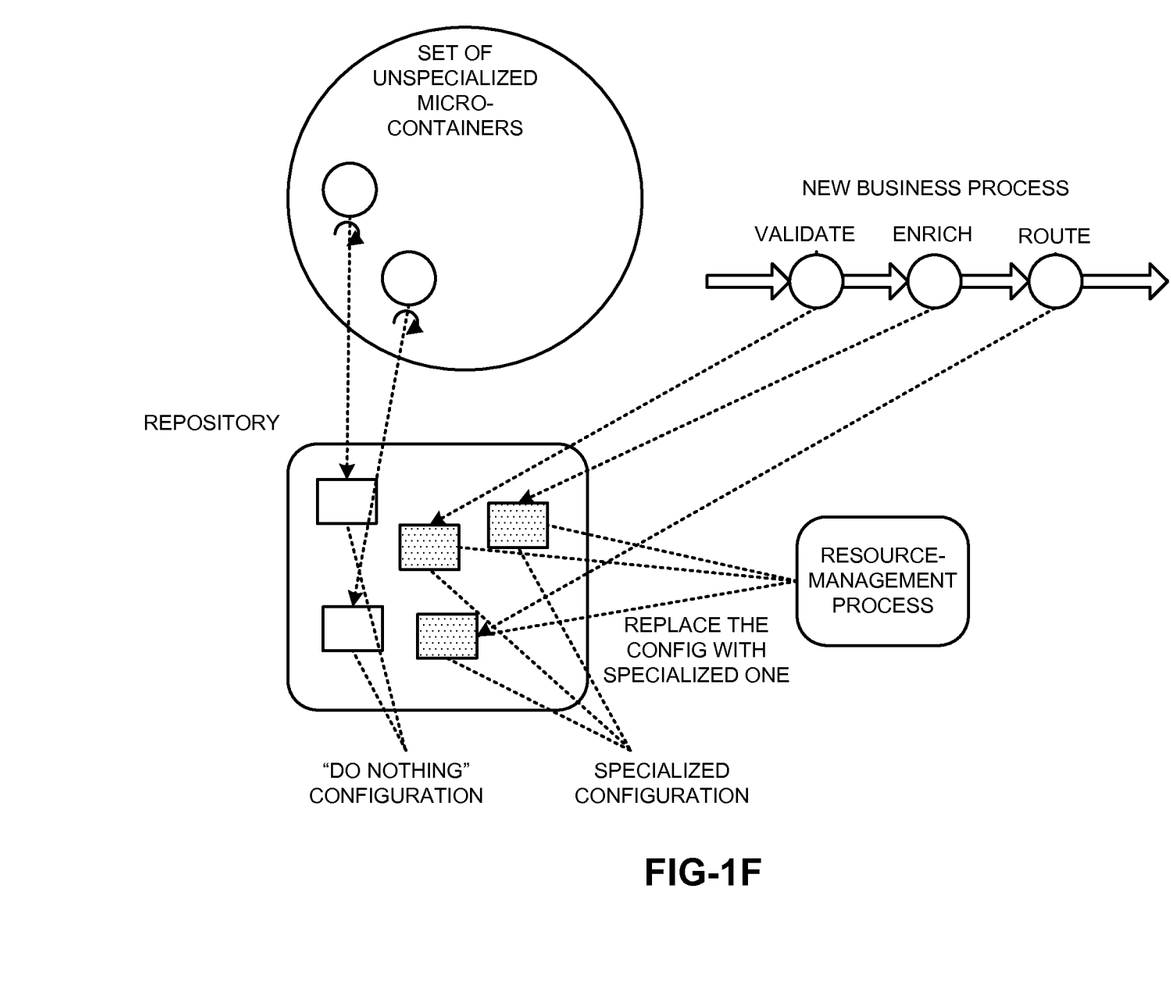
FIG. 1F illustrates stage two of use case two of the exemplary embodiment in accordance with an embodiment of the present invention.

In FIG. 1E, a second use case is presented wherein a new, non-existing business process is required. FIG. 1E illustrates the second use case as the system exists prior to adding the new, non-existing business process.

In FIG. 1D, the resource-management process replaces the configuration of the unspecialized micro-containers in the repository and forms the new business process.

The techniques utilized to implement both of these use cases are described in more detail below. In the exemplary embodiment, the system comprises the following components, each of which will be described in more detail below: A pool of unspecialized software micro-containers proactively looking for specialization; a repository component that stores configuration resources; and a resource-management process that manages the configuration in the repository, thereby controlling the specialization of the software micro-containers.

The unspecialized software micro-container is the main component and has the following characteristics: the ability to interpret and execute a relatively simple business logic and perform a relatively simple business function; and the ability to proactively search for and interpret specializing configuration and business logic from a dedicated resource URL. Note that the specialization happens when the configuration resource referenced by the dedicated URL is modified with specialization instructions that can be interpreted and followed by the software micro-container.

In terms of complexity, the software micro-containers are somewhere between a completely generic container solution, such as a Linux or Solaris virtual container, and a completely specialized container solution, such as a specific application deployed in a container. A software micro-container can fulfill a more generic role, or a role within a category. For example, the software micro-container may be defined as a generic transformer that receives a message from a queue, transforms or enriches the message, and sends the message to another queue. The sequence of actions can be defined; however, the source queue, the transformation file, and the destination queue can be provided in the REST configuration and injected through the repository.

After fulfilling a specialization role, the software micro-containers can be released and become unspecialized again, and can continue to look proactively for a new task.

In one embodiment of the present invention, an unspecialized software micro-container developed in XSLT for use in a DataPower device might have the following configuration resource:

```
<configuration>
<aspect name="requestTransformation">
<advice type="before"
active="true"
pointcutSoapOperation="create*"
logic="https://registryhost/log.xml"
config="https://registryhost/logconfiguration.xml"
readonly="true"/>
<advice type="before"
active="true"
pointcutXpath=" . . . "
logic="https://registryhost/debug.xml"
config="https://registryhost/debugconfiguration.xml"
readonly="true"/>
<transformation logic="local:///requestTransform.xsl"/>
<advice type="after"
active="true"
pointcutSoapOperation="*"
logic="https://registryhost/injectHeader.xml"
readonly="false">
<param name="transactionID" value="DP-generated">. . .
</advice>
<advice type="after"
active="false"
pointcutSoapOperation="create*"
logic="https://registryhost/log.xml"
config="https://registryhost/logconfiguration.xml"
readonly="true/">
<advice type="after"
active="true"
pointcutSoapOperation="*"
logic="https://registryhost/lvalidate.xml"
readonly="true">
<param name="schemaLocation"
value="local:///wsdldefinition.wsdl">
</advice>
</aspect>
</configuration>
```

The repository component holds the configuration of the individual software micro-containers and provides the configuration when requested. A URL uniquely identifies each configuration. The repository provides a REST-type of interface to the managed resources. Note that the repository can be implemented with a simple Web/Apache cluster, or with a more sophisticated repository solution, as long as the repository provides a REST interface.

The resource-management process takes care of managing the configuration in the repository, and subsequently controls the specialization of the software micro-containers. The resource management can be a human process of building the right sequence of steps, or an automatic process that watches for certain threshold values (i.e., too many messages in a queue, CPU utilization is too high, etc.) and instructs the specialization of more containers. In some embodiments, the resource-management process is a combination of an automatic process and human input to account for unusual or unexpected events.

In another exemplary embodiment, the system also includes a work-distribution message board. The work-distribution message board, by intent, resembles a plain job-posting board. In human society, when an individual applies for a job, usually her background and past experience are considered for a certain position. With the work-distribution message board, a worker container goes to a special location (message board URL) and presents a current specialization (identified by a resource URL). Based on the current container specialization, the message board returns a new specialization resource to the container, or declares that there is no proper assignment at the moment and orders the worker container to check again later.

Note that, in this embodiment, a worker container is an unspecialized software micro-container that has both: the ability to interpret and execute a relatively simple business logic and perform a relatively simple business function; and the ability to proactively search for and interpret specializing configuration and business logic from a work-distribution message board identified by a dedicated resource URL.

Computing Environment

FIG. 1A illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
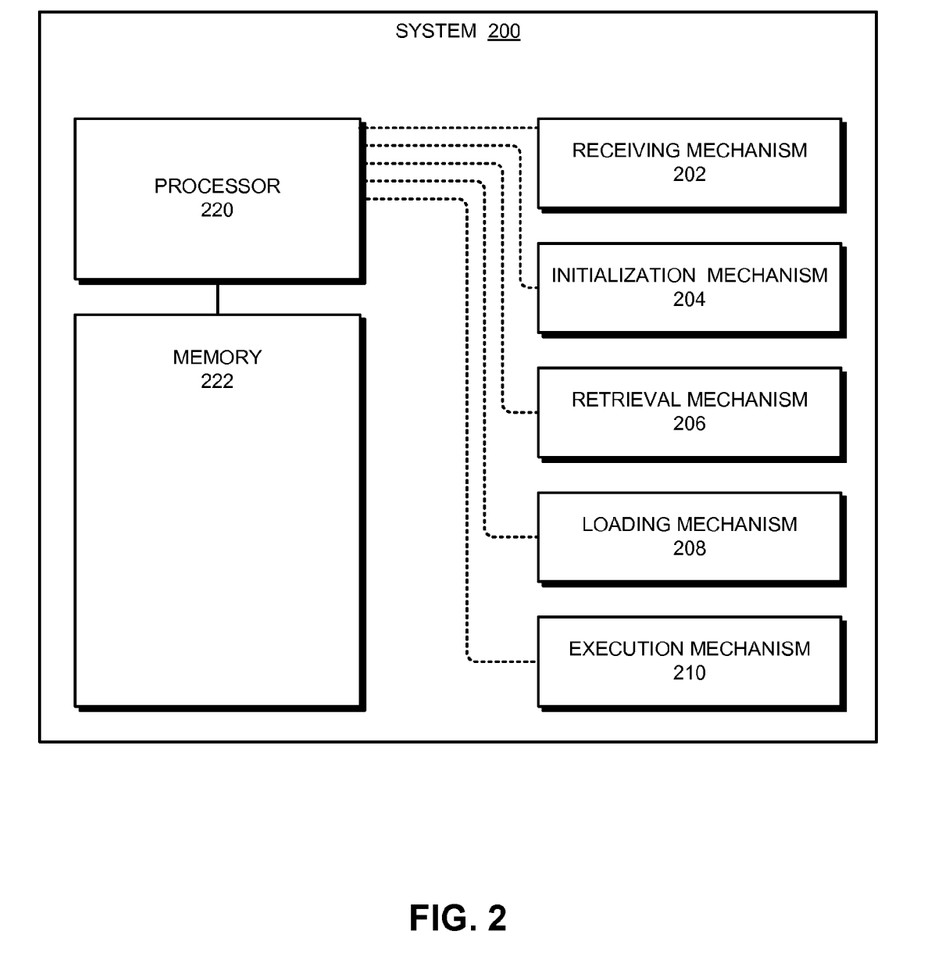
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, initialization mechanism 204, retrieval mechanism 206, loading mechanism 208, execution mechanism 210, processor 220, and memory 222.

Building Business Processes with Unspecialized Software Micro-Containers

Figure 3:
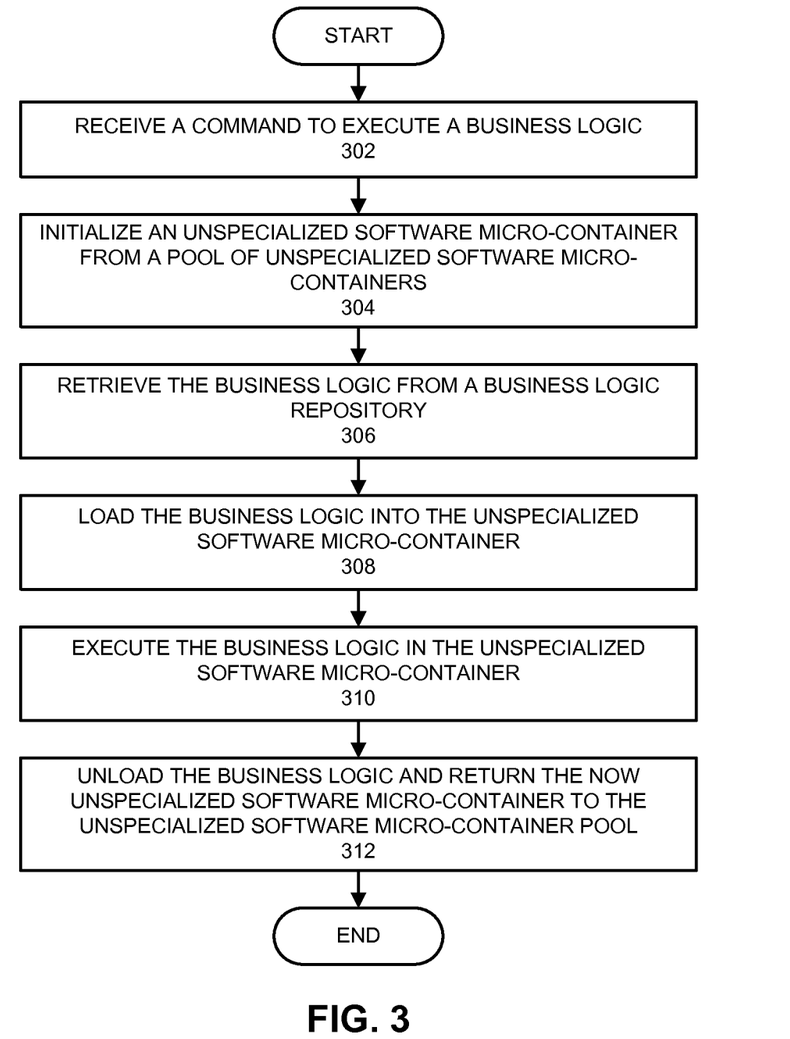
FIG. 3 presents a flow chart illustrating the process of using unspecialized software micro-containers to build complex dynamic business processes in accordance with an embodiment of the present invention.

FIG. 3 presents a flow chart illustrating the process of using unspecialized software micro-containers to build complex dynamic business processes in accordance with an embodiment of the present invention.

During operation, receiving mechanism 202 receives a command to execute a business logic (operation 302). Note that this command can be received from an automated process executing on system 200, or may come from a user, such as user 120. In response to the command, initialization mechanism 204 initializes an unspecialized software micro-container from a pool of unspecialized software micro-containers (operation 304). Next, retrieval mechanism 206 retrieves the business logic from a business logic repository (operation 306). Loading mechanism 208 then loads the business logic into the unspecialized software micro-container (operation 308). Next, execution mechanism 210 executes the business logic in the unspecialized software micro-container (operation 310). Note that the business logic may be executed until a specified amount of time has elapsed, until a detectable condition is met, until execution is cancelled by user 120, or until the business logic has reached a natural execution endpoint. Finally, initialization mechanism 204 unloads the business logic and returns the now unspecialized software micro-container to the unspecialized software micro-container pool (operation 312).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using unspecialized software micro-containers to build complex dynamic business processes, the method comprising:

receiving, at a computer system, a command to execute a business logic;

in response to the command, initializing an unspecialized software micro container from a pool of unspecialized software micro-containers, wherein an unspecialized software micro-container has the ability to interpret and execute business logic and perform a business function, and the ability to proactively search for and interpret specializing configuration and business logic;

retrieving the business logic from a business logic repository;

loading the business logic into the unspecialized software micro-container;

executing the business logic in the unspecialized software micro-container;

unloading the business logic; and returning the unspecialized software micro-container to the pool of unspecialized software micro-containers.

2. The computer-implemented method of claim 1, wherein retrieving the business logic from the business logic repository involves retrieving the business logic from a predetermined Uniform Resource Locator (URL).

3. The computer-implemented method of claim 1, wherein the operations of unloading the business logic and returning the unspecialized software micro-container to the pool of unspecialized software micro-containers are performed when a pre-determined criterion is met.

4. The computer-implemented method of claim 1, wherein the operations of unloading the business logic and returning the unspecialized software micro-container to the pool of unspecialized software micro-containers are performed at a pre-determined time.

5. The computer-implemented method of claim 1, wherein receiving the command to execute the business logic involves receiving the command from a user.

6. The computer-implemented method of claim 1, wherein receiving the command to execute the business logic involves receiving the command from a computer-implemented controller.

7. The computer-implemented method of claim 6, wherein receiving the command from the computer-implemented controller involves receiving the command when a pre-determined criterion is met.

8. The computer-implemented method of claim 6, wherein receiving the command from the computer-implemented controller involves receiving the command at a pre-determined time.

9. The computer-implemented method of claim 1, wherein the unspecialized software micro-container is an Extensible Stylesheet Language Transformations (XSLT) container.

10. The computer-implemented method of claim 1, wherein the unspecialized software micro-container is a scripting language container.

11. A non-transitory computer-readable storage medium storing instructions that when executed by a computer cause the computer to perform a method for using unspecialized software micro-containers to build complex dynamic business processes, the method comprising:
    receiving, at a computer system, a command to execute a business logic;
    in response to the command, initializing an unspecialized software micro-container from a pool of unspecialized software micro-containers, wherein an unspecialized software micro-container has the ability to interpret and execute business logic and perform a business function; and the ability to proactively search for and interpret specializing configuration and business logic;
    retrieving the business logic from a business logic repository;
    loading the business logic into the unspecialized software micro-container;
    executing the business logic in the unspecialized software micro-container; unloading the business logic; and
    returning the unspecialized software micro-container to the pool of unspecialized software micro-containers.

12. The non-transitory computer-readable storage medium of claim 11, wherein retrieving the business logic from the business logic repository involves retrieving the business logic from a predetermined Uniform Resource Locator (URL).

13. The non-transitory computer-readable storage medium of claim 11, wherein the operations of unloading the business logic and returning the unspecialized software micro-container to the pool of unspecialized software micro-containers are performed when a pre-determined criterion is met.

14. The non-transitory computer-readable storage medium of claim 11, wherein the operations of unloading the business logic and returning the unspecialized software micro-container to the pool of unspecialized software micro-containers are performed at a pre-determined time.

15. The non-transitory computer-readable storage medium of claim 11, wherein receiving the command to execute the business logic involves receiving the command from a user.

16. The non-transitory computer-readable storage medium of claim 11, wherein receiving the command to execute the business logic involves receiving the command from a computer-implemented controller.

17. The non-transitory computer-readable storage medium of claim 16, wherein receiving the command from the computer-implemented controller involves receiving the command when a pre-determined criterion is met.

18. The non-transitory computer-readable storage medium of claim 16, wherein receiving the command from the computer-implemented controller involves receiving the command at a pre-determined time.

19. The non-transitory computer-readable storage medium of claim 11, wherein the unspecialized software micro-container is an Extensible Stylesheet Language Transformations (XSLT) container.

20. The non-transitory computer-readable storage medium of claim 11, wherein the unspecialized software micro-container is a scripting language container.

21. An apparatus configured to use unspecialized software micro-containers to build complex dynamic business processes, comprising:
    a memory;
    a processor;
    a receiving mechanism configured to receive a command to execute a business logic;
    an initialization mechanism configured to initialize an unspecialized software micro-container from a pool of unspecialized software micro-containers in response to the command, unload the business logic and return the unspecialized software micro-container to the pool of unspecialized software micro-containers, wherein an unspecialized software micro-container has the ability to interpret and execute business logic and perform a business function; and the ability to proactively search for and interpret specializing configuration and business logic;
    a retrieval mechanism configured to retrieve the business logic from a business logic repository;
    a loading mechanism configured to load the business logic into the unspecialized software micro-container; and
    an execution mechanism configured to execute the business logic in the unspecialized software micro-container.

* * * * *